Inventors
WILLIAM L. GARFIELD
BRIAN H. A. RIXON

April 26, 1966     W. L. GARFIELD ET AL     3,248,728
EXCESS SPEED INDICATOR

Inventors
WILLIAM L. GARFIELD
BRIAN H. A. RIXON
By
Attorney

United States Patent Office 3,248,728
Patented Apr. 26, 1966

3,248,728
EXCESS SPEED INDICATOR
William Littery Garfield and Brian Hugh Arthur Rixon, London, England, assignors to International Standard Electric Corporation, New York, N.Y., a corporation of Delaware
Filed Mar. 25, 1964, Ser. No. 354,596
Claims priority, application Great Britain, June 6, 1963, 22,536/63
5 Claims. (Cl. 343—5)

This invention relates to electrical speed indicators for indicating when the rate of approach or recession of one body to or from another exceeds a value which is a function of the distance between the two bodies.

According to the invention there is provided an electrical speed indicator to indicate when the speed of approach or recession of one body with respect to another exceeds a value dependent upon the distance between the two bodies including means to produce an electric signal having a magnitude dependent upon the distance between the two bodies, a differentiating circuit to differentiate the said parameter of the electric signal with respect to time, a combining circuit to combine additively the electric signal and the differentiated electric signal, a detector to detect the polarity of the sum of the signals, and an indicator operated by an output signal from the detector.

An embodiment of the invention in apparatus which is installed in an aircraft and which gives an indication whenever the rate of descent of the aircraft exceeds that which is safe for that particular altitude will now be described with reference to the accompanying drawings of which:

When an aircraft descends below a certain altitude, for example 2500 feet, in its approach to landing, the maximum safe rate of descent varies according to altitude.

Figure 1:
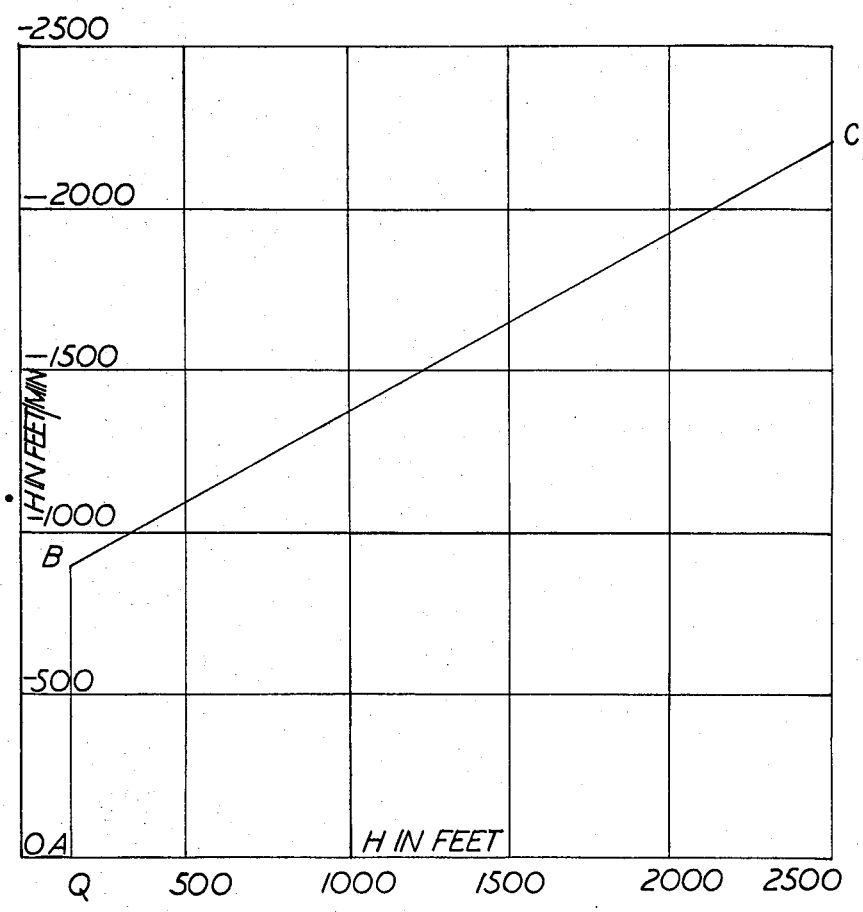
FIG. 1 shows an example of a safe rate of descent curve of an aircraft.

FIG. 1 shows a typical safe rate of descent curve for an aircraft. The abscissa H represents the height of the aircraft above the ground in feet and the ordinate $\dot{H}$ represents the rate of descent of the aircraft in feet per minute. $\dot{H}$ has a negative value because the aircraft is descending.

The "rate of descent curve" can be described by two straight lines AB and BC.

For the straight line AB, H has a constant value Q, which in this example is 150 feet.

The straight line BC can be expressed in the form $$H + K\dot{H} + C = 0$$

where K and C are constants.

At heights between 2500 feet and Q the rate of descent of the aircraft is, under normal conditions, less than that defined by the slope of the line BC. It is, however, necessary to provide a warning indication when the actual rate of descent of the aircraft would, if plotted, penetrate the curve BC. At heights below Q the warning indication will always be given if the aircraft continues its descent because for the curve AB, $\dot{H} = 0$.

When the rate of descent of the aircraft is less than that defined by the slope of BC the sum $H + K\dot{H} + C$ is a positive quantity. When the rate of descent of the aircraft is greater than that defined by the slope of BC the sum $H + K\dot{H} + C$ is a negative quantity because $\dot{H}$ is negative. The invention operates basically by generating electrical signals which are analogues of H, $K\dot{H}$ and C, adding the electrical signals and determining the polarity of the resultant signal.

The basic operation of the invention will now be described with reference to FIG. 2.

Figure 2:
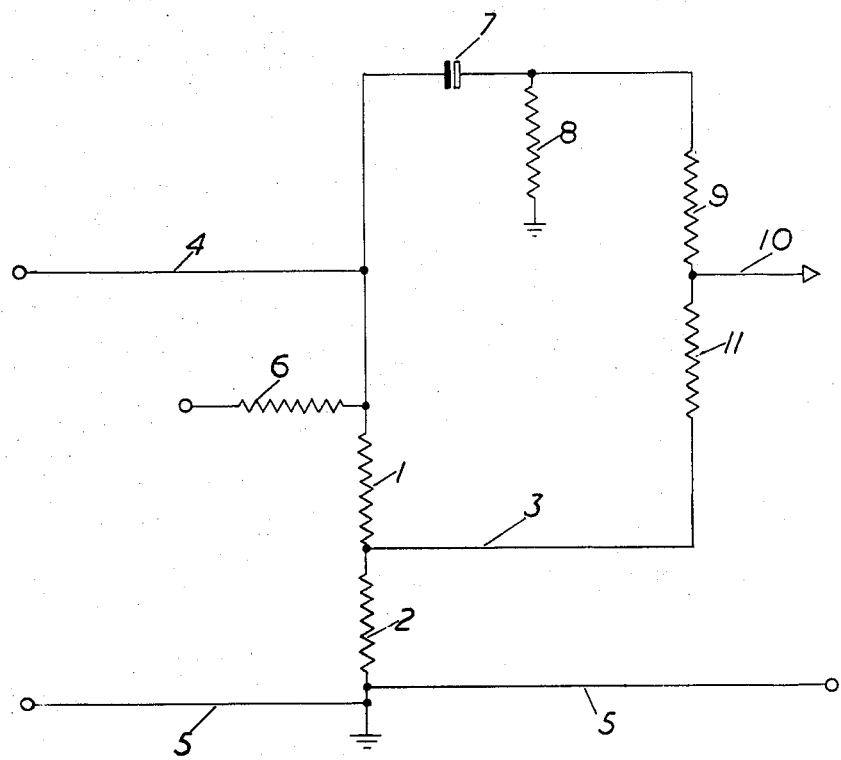
FIG. 2 is a circuit diagram illustrating the basic operation of the embodiment of the invention.

Referring to FIG. 2 there is shown an attenuator network comprising resistors 1 and 2 connected in series and a conductor 3 connected to the junction of the two resistors. The series combination of the resistors 1 and 2 is connected across the output terminals of a height analogue voltage source by the conductors 4 and 5, and is also connected across the terminals of a D.C. voltage source via a resistor 6, connected between one terminal of the D.C. voltage source, and the conductor 5 which is earthed and common to the D.C. voltage source and to the height analogue voltage source. The polarity of the connections to the height analogue and D.C. voltage sources should be such that the respective currents flowing in the resistors 1 and 2 add arithmetically. The conductor 4 is also connected to a differentiating circuit comprising a capacitor 7 and a resistor 8 in series. The resistor 8 is connected between one terminal of the capacitor 7 and earth. The junction of the resistor 8 and the terminal of the capacitor 7 is connected via a resistor 9 to a conductor 10. The conductor 3 is also connected via a resistor 11 to the conductor 10.

The resistance values of the resistors 1 and 2 are made such that taking into account the resistance values of the resistors 11, 9 and 8 and the resistance of any following circuit across conductors 10 and 5, the voltage of the height analogue and D.C. signals between conductors 10 and 5 is equal to $1/K$ of the corresponding voltages at the signal sources. If H is the height analogue voltage, and C is the D.C. voltage the sum of the height analogue and D.C. voltage signals between the conductors 10 and 5 is equal to $$\frac{H+C}{K}$$

The voltage across the resistor 8 is equal to the rate of change of H, since the capacitor 7 and the resistor 8 together form a differentiating network. If $\dot{H}$ represents the voltage between conductors 10 and 5 produced by the differentiation of H, the total potential between the conductors 10 and 5 is given by $$\frac{H+C}{K} + \dot{H}$$

For convenience in circuit design the equation $$H + K\dot{H} + C = 0$$

has been transformed to $$\frac{H+C}{K} + \dot{H} = 0$$

For a safe manoeuvre of the aircraft the potential between the conductors 10 and 5 is a positive. If the rate of descent exceeds the slope of the line BC the potential between the conductors 10 and 5 is negative since $\dot{H}$ exceeds $$\frac{H+C}{K}$$

and $\dot{H}$ is negative during descent. It is therefore necessary to arrange that a warning indication is given whenever the potential between the conductors 10 and 5 becomes negative.

Figure 3:
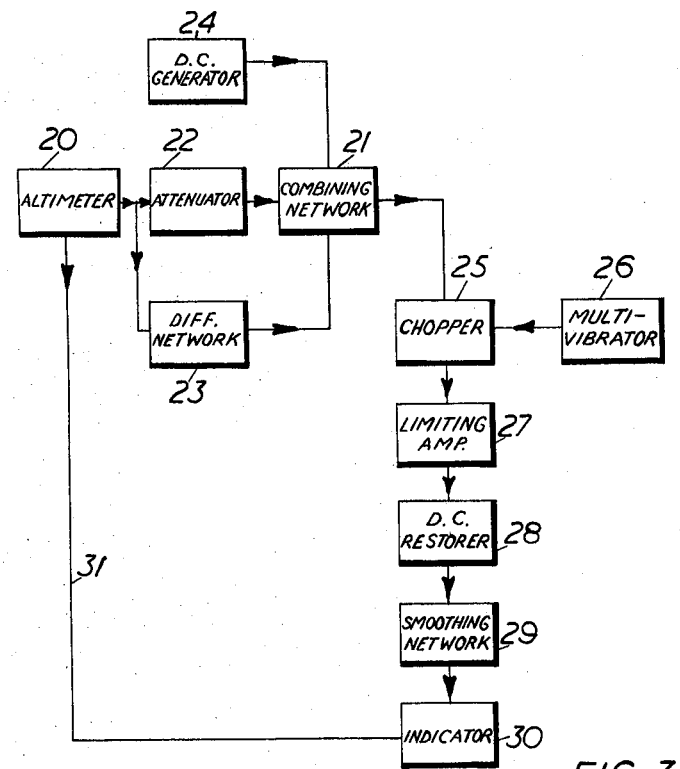
FIG. 3 is a schematic diagram of the embodiment of the invention.

A further description of the arrangement used in the embodiment of the invention will now be given with reference to FIG. 3 of the accompanying drawings which shows an aircraft radio altimeter 20 the output terminals of which are coupled to input terminals of combining network 21 by two signal paths, one of which comprises an attenuator 22, the other comprising a differentiating network 23. A fixed D.C. voltage source 24 is also connected to input terminals of the combining network 21. The output terminals of the combining network 21 are coupled to the input terminals of an amplitude modulator which in the embodiment of the invention is a chopper circuit arrangement 25 which is also coupled to a multivibrator 26. A limiting amplifier 27 is coupled between the output terminals of the chopper 25 and the input terminals of a D.C. restorer 28. The output terminals of the D.C. restorer 28 are connected to the input terminals of a smoothing network 29. A warning indicator 30 is coupled to the output terminals of the smoothing network 29.

The altimeter 20 used in this embodiment of the invention is a radio altimeter, but other apparatus capable of producing a D.C. signal which is an analogue of the height of the aircraft could be used, for example, an aneroid altimeter could be used in conjunction with a transducer. An advantage of using a radio altimeter lies in the fact that it measures terrain clearance and thus registers flying over rising ground as a descent. The attenuator 22 and the differentiation network 23 consist of a network similar to the corresponding networks shown in FIG. 2. The combining circuit 21 consists of a resistive network.

In order that the warning indicator 30 may be actuated at all altitudes less than 150 feet regardless of the rate of descent, a triggering signal is fed over a path 31 from the altimeter 20 to the indicator 30.

A signal voltage $h$ is fed to the output terminals of the attenuator 22 from the output terminals of the radio altimeter 20. The signal voltage $h$ is proportional to the height of the aircraft above the ground. The constants of the attenuator network 22 are such that a signal voltage $h/K$ is fed to the combining circuit 21. The constant term K is derived from the "safe manoeuvre" curve similar to that shown in FIG. 1. The height signal voltage $h$ is also fed to the differentiating network 23, and from the output terminals of the differentiating network a negative signal voltage $\dot{h}$, equal to the rate of change of $h$, is fed to the combining circuit 21. A fixed D.C. voltage of value $C/K$ is also fed to the combining circuit 21 from the D.C. source 24. The quantity C is derived, like the constant K, from the "safe manoeuvre" curve. The signal voltages $h$, $\dot{h}$ and $C/K$ are added in the combing circuit 21. When $\dot{h}$ is less than $$h+\frac{C}{K}$$

the output signal from the combining circuit is positive. When $\dot{h}$ is greater than $$h+\frac{C}{K}$$

the output signal from the combining circuit 21 is negative. The remaining apparatus shown in FIG. 3 is used to determine the polarity of the output signal from the combining circuit 21 which is only a few millivolts and to operate a warning indicator when the signal is negative.

Figure 4:
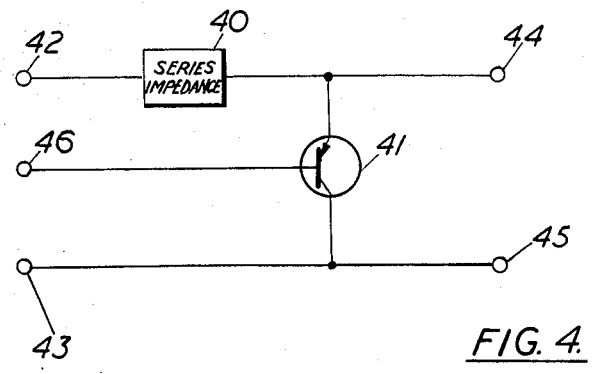
FIG. 4 shows a circuit diagram of a chopper circuit.

The output signal from the combining network 21 is fed to the chopper circuit 25. The basic chopper circuit is shown in FIG. 4 and consists of a series impedance 40 connected in the signal path and a transistor 41 operated as a switch and connected across the signal path. The signal input terminals to the chopper circuit are represented at 42 and 43 and the signal output terminals at 44 and 45. A signal to drive the chopper is obtained by connecting terminals 46 and 43 to the output terminals of the multivibrator 26, of FIG. 3. Terminal 26 is connected to the base of the transistor 41 and the drive signal from the multivibrator switches the transistor into either a highly conducting or a virtually non-conducting state.

The impedance 40, which in this embodiment of the invention is a resistance, is sufficiently large to cause the output voltage between terminals 44 and 45 to become negligibly small when the transistor 41 is conducting.

The signal voltage between the collector and the emitter of the transistor is so small as not to affect substantially the conductivity of the transistor.

FIG. 5A represents a positive error signal 50 of constant magnitude applied between the input terminals 42 and 43 of the chopper circuit. The dotted line 51 represents earth potential. FIG. 5B represents a negative error signal applied between terminals 42 and 43.

Figure 5:
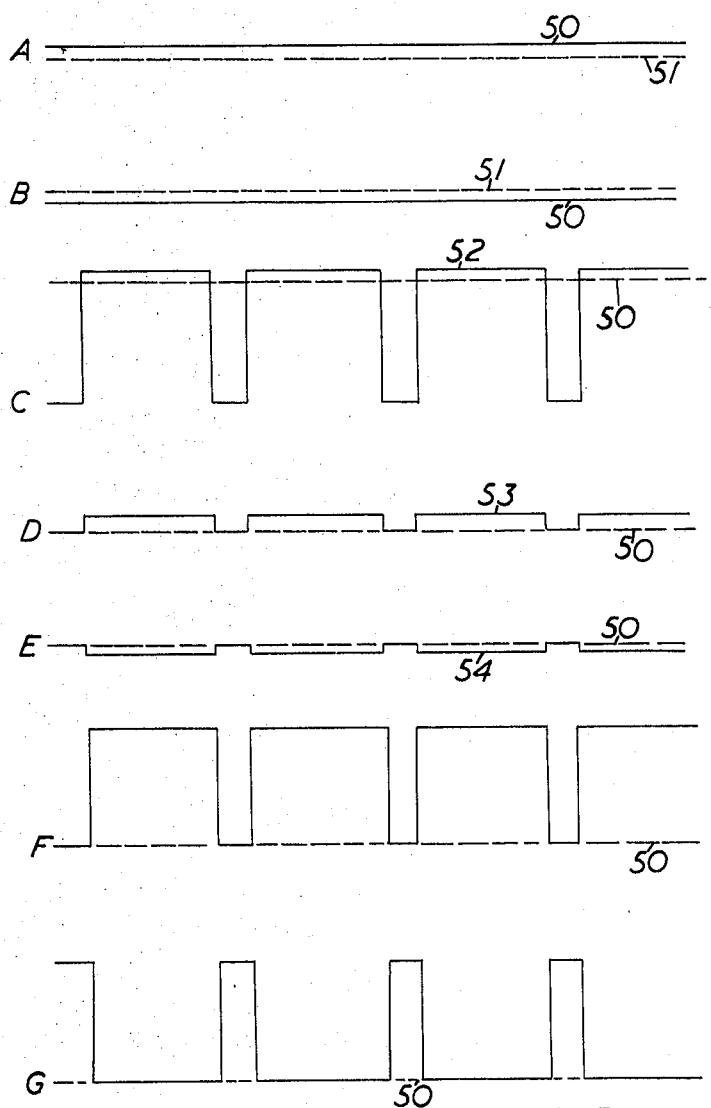
FIG. 5 shows signal waveforms in the embodiment.

FIG. 5C represents the waveform of the drive signal 52 between terminals 46 and 43 of the chopper circuit. The duration of the positive and negative going periods of the drive signal are unequal, and in this embodiment of the invention the relative durations are a ratio 10:1. In general the magnitude of the error signal voltage does not remain constant, but can be considered as remaining constant over a few cycles of the drive signal wave as shown in FIG. 5.

The transistor 41 is of PNP type and therefore conducts during negative excursions of the drive signal wave, and is cut off during positive excursions of the drive signal wave. The output signal between terminals 44 and 45 of the chopper circuit is shown in FIGS. 5D and E. FIG. 5D shows an output signal waveform corresponding to the positive input error signal of FIG. 5A. During positive excursions of the drive signal waveform positive voltage pulses 53 and obtained; during negative excursions of the drive signal voltage the output voltage is substantially zero.

The output signal from the chopper circuit 25 is amplified and limited to a constant amplitude in the limiting amplifier 27, and the D.C. component of the resulting signal is restored in the D.C. restorer 28. FIGS. 5F and G represent the voltage waveform at the output terminals of the D.C. restorer 28 when the error signal is positive and negative respectively. The output signal from the D.C. restorer is smoothed in a smoothing network 30 to produce a positive D.C. voltage having two discrete levels depending upon the polarity of the error signal. The level of the D.C. voltage is used to control the operation of a relay in the alarm circuit 30 which in turn actuates a warning indicator when the D.C. voltage has the lower level corresponding to the waveform shown at FIG. 5G, i.e., when the polarity of the error signal is negative. The apparatus could equally well be arranged so that a negative error signal produces a larger D.C. output and that the warning indicator is actuated accordingly.

Although amplitude modulation of the combined signals is obtained by actually chopping the signals in the embodiment of the invention, it is not essential that the degree of modulation is such that the signals are actually chopped. It is also not essential that a rectangular wave modulating signal is used, other forms of asymmetrical waves could be used. It is convenient to modulate the combined signals, but each of the three signals fed to the input of the combining circuit could be individually amplitude modulated by the same modulating waveform prior to combination.

The application of the invention is not limited to cases in which the differential coefficient, $\dot{H}$, of the distance between the two bodies is negative, that is to say, when the two bodies are approaching. In the case of an aircraft or other vehicle which is ascending from the ground H is positive and the sum of the signals representing H, $\dot{H}$ and C will always be positive. If the polarity of one of the three signals is deliberately inverted the polarity of the sum of the signals will change when $\dot{H}$ exceeds the permissible value.

Although in the embodiment of the invention an altimeter is used to measure the distance between the two bodies, other types of distance measuring apparatus capable of producing an output signal which is an electrical analogue of the distance between the two bodies may be used.

What we claim is:

1. An electrical speed indicator to indicate when the speed of approach or recession of one body with respect to another exceeds a value dependent upon the distance between the two bodies including means to produce an electric signal having a magnitude dependent upon the distance between the two bodies, a differentiating circuit to differentiate the said parameter of the electric signal with respect to time, a combining circuit to combine additively the electric signal and the differentiated electric signal, a detector to detect the polarity of the sum of the signals, and an indicator operated by an output signal from the detector.

2. An electrical speed indicator as claimed in claim 1 in which one of the bodies is the earth and the means to produce an electric signal having a magnitude dependent upon the distance between the two bodies includes an altimeter to measure the height of the body above the ground.

3. An electrical speed indicator as claimed in claim 2 in which the said means to produce an electric signal includes a signal source of constant magnitude.

4. An electrical speed indicator as claimed in claim 2 in which the said detector includes an amplitude modulator to modulate the amplitude of the said sum of the signals with a periodic non-symmetrical modulating wave, a direct current restorer circuit to convert the modulated signal wave to a unipolar signal wave, and indicator means responsive to the magnitude of the direct current component of the unipolar signal wave.

5. An electrical speed indicator including a radio altimeter to measure the height of an aircraft above the ground, an additive combining circuit having input terminals and an output terminal, a first and second signal path coupled between height signal output terminals of the radio altimeter and input terminals of an additive combining circuit, the second signal path including a differentiating circuit, a direct current voltage source of fixed voltage, a signal path between the said direct current voltage source and the input terminals of the additive combining circuit, an amplitude modulator connected in a signal path coupled to the output terminals of the additive combining circuit, a generator of a modulating signal pulse having an unequal mark to space ratio coupled to the amplitude modulator, a direct current restorer circuit, amplitude limiter coupled between the output terminals of the amplitude modulator and the input terminals of said direct current restorer circuit, and indicator means responsive to a direct current signal output from the direct current restorer.

References Cited by the Examiner

UNITED STATES PATENTS 2,851,120  9/1958  Fogiel _____ 343—112.4

CHESTER L. JUSTUS, *Primary Examiner.*

LEWIS H. MYERS, *Examiner.*

R. D. BENNETT, *Assistant Examiner.*